(12) United States Patent
Gonidec et al.

(10) Patent No.: US 8,833,055 B2
(45) Date of Patent: Sep. 16, 2014

(54) LOCKING/UNLOCKING DEVICE FOR A THRUST REVERSER WITH A SLIDING COVER AND ADAPTIVE NOZZLE FOR AIRCRAFT ENGINE NACELLE

(71) Applicant: Aircelle, Gonfreville l'Orcher (FR)

(72) Inventors: Patrick Gonidec, Bretx (FR); Philippe Avenel, Vitanval (FR); Pierre Moradell-Casallas, Saint Georges des Groseillers (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/801,813

(22) Filed: Mar. 13, 2013

(65) Prior Publication Data
US 2014/0000238 A1 Jan. 2, 2014

Related U.S. Application Data

(63) Continuation of application No. PCT/FR2011/051748, filed on Jul. 20, 2011.

(30) Foreign Application Priority Data

Sep. 13, 2010 (FR) .................................... 10 57240

(51) Int. Cl.
*F02K 1/09* (2006.01)
*F02K 1/76* (2006.01)
*F02K 1/72* (2006.01)

(52) U.S. Cl.
CPC . *F02K 1/766* (2013.01); *F02K 1/72* (2013.01); *Y02T 50/671* (2013.01); *F02K 1/09* (2013.01)
USPC .......................... 60/226.2; 60/230; 244/110 B

(58) Field of Classification Search
CPC ........... F02K 17/63; F02K 1/766; F02K 1/09; F02K 1/72; F02K 1/76
USPC ....... 60/226.1, 226.2, 226.3, 230; 244/110 B; 239/265.29
See application file for complete search history.

(56) References Cited

U.S. PATENT DOCUMENTS

| | | | |
|---|---|---|---|
| 7,216,581 B2 * | 5/2007 | McAuley | 92/21 MR |
| 2010/0192715 A1 * | 8/2010 | Vauchel et al. | 74/89.35 |
| 2010/0205931 A1 * | 8/2010 | Baudu et al. | 60/226.2 |
| 2010/0218479 A1 * | 9/2010 | Moradell-Casellas et al. | 60/226.2 |
| 2012/0137654 A1 * | 6/2012 | Burgess | 60/204 |
| 2013/0292489 A1 * | 11/2013 | Vauchel et al. | 239/265.19 |

FOREIGN PATENT DOCUMENTS

| | | | |
|---|---|---|---|
| FR | 2622929 A1 | 5/1989 | |
| FR | 2902839 A1 | 12/2007 | |
| GB | 2446441 A | 8/2008 | |

* cited by examiner

*Primary Examiner* — Phutthiwat Wongwian
*Assistant Examiner* — Carlos A Rivera
(74) *Attorney, Agent, or Firm* — Brinks Gilson & Lione

(57) ABSTRACT

A locking/unlocking device for a thrust reverser with sliding cover and adaptive nozzle is provided that includes a fixed pin secured to a fixed structure of the reverser, a first sleeve secured to the sliding cover and able to accommodate the pin, a second sleeve slidably mounted on the first sleeve, a third sleeve secured to the adaptive nozzle and slidably mounted on the second sleeve, first locking means able to lock the first sleeve with respect to the pin, second locking means able to lock the second sleeve with respect to the first sleeve, and third locking means able to lock the third sleeve with respect to the second sleeve.

7 Claims, 4 Drawing Sheets

Figure 1:
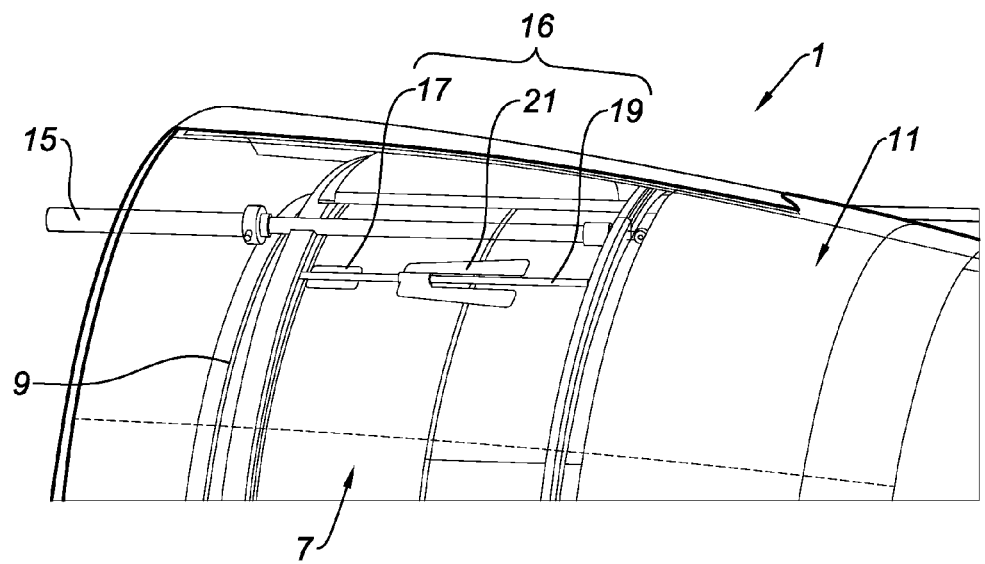

LOCKING/UNLOCKING DEVICE FOR A THRUST REVERSER WITH A SLIDING COVER AND ADAPTIVE NOZZLE FOR AIRCRAFT ENGINE NACELLE

CROSS-REFERENCE TO RELATED APPLICATIONS

This application is a continuation of International Application No. PCT/FR2011/051748 filed on Jul. 20, 2011, which claims the benefit of FR 10/57240, filed on Sep. 13, 2010. The disclosures of the above applications are incorporated herein by reference.

FIELD

The present disclosure relates to a locking/unlocking device for a thrust reverser with a sliding cover and adaptive nozzle for an aircraft engine nacelle.

BACKGROUND

The statements in this section merely provide background information related to the present disclosure and may not constitute prior art.

An airplane is moved by several turbojet engines each housed in a nacelle serving to channel the flows of air created by the turbojet engine, which also houses a set of related actuating devices connected to its operation and performing various functions when the turbojet engine is running or stopped.

These related actuating devices in particular comprise a mechanical thrust reversal system and an adaptive nozzle system.

A nacelle generally has a tubular structure comprising an air intake upstream from the turbojet engine, a middle section designed to surround a fan of the turbojet engine, a downstream section housing thrust reversal means and designed to surround the combustion chamber of the turbojet engine, and generally ends with a jet nozzle whereof the outlet is situated downstream from the turbojet engine.

Modern nacelles are designed to house a dual-flow turbojet engine capable of creating, by means of the rotating fan blades, a hot air flow (also called primary flow) coming from the combustion chamber of the turbojet engine, and a cold air flow (secondary flow) that circulates outside the turbojet engine through an annular passage, also called the tunnel, formed between a fairing of the turbojet engine and an inner wall of the nacelle. The two flows of air are discharged from the turbojet engine through the rear of the nacelle.

During landing of an airplane, the role of a thrust reverser is to improve the braking capacity thereof by reorienting at least part of the thrust generated by the turbojet engine forward. In this phase, the reverser covers the cold flow tunnel and orients that cold flow toward the front of the nacelle, thereby creating a counter-thrust that is added to the braking of the wheels of the airplane.

The means used to perform that reorientation of the cold flow vary depending on the type of reverser. However, in most cases, the structure of a reverser comprises movable covers that can be moved between an open or "reverse jet" position, in which they open a passage in the nacelle designed for the deflected flow, on the one hand, and a closed or "direct jet" position, in which they close that passage. These sliding covers may perform a deflection function or simply serve to activate other deflection means.

In the case of a cascade thrust reverser, also called a cascade reverser, the reorientation of the flow of air is done by cascade vanes, the cover performing only a simple sliding function serving to expose or cover said vanes, the translation of the movable cover being done along a longitudinal axis substantially parallel to the axis of the nacelle. Complementary blocking panels, actuated by the sliding of the cover, generally make it possible to close the tunnel downstream of the cascade vanes so as to optimize the reorientation of the cold flow toward the outside of the nacelle.

In addition to its thrust reversal function, the sliding cover belongs to the downstream section of the nacelle and has a downstream portion forming a jet nozzle serving to channel the discharge of the flows of air toward the outside. This nozzle may supplement a primary nozzle channeling the hot flow, and is then called the secondary nozzle.

The thrust reversal performance is obtained in a satisfactory manner with the known devices. However, for improved aerodynamics and fuel consumption reasons, it is very advantageous to be able to adjust the section of the cold air flow outlet downstream of the nacelle. It is in fact useful to be able to increase that section during takeoff and landing phases, and to reduce it during cruising phases: the term "variable fan nozzle" (VFN) is often used.

Such a system is described in documents FR 2 622 929 and FR 2 902 839, for example.

These documents describe the implementation of cascade thrust reversers equipped with an adaptive nozzle and, to that end, provide a movable fairing comprising an upstream portion performing the function of the sliding reverser cover and a downstream portion performing the function of the adaptive nozzle, these two portions being able to be connected to each other by bolt means.

It is important to be able to actuate these two portions of the nacelle independently: it is in particular desirable to be able to increase the section of the adaptive nozzle without actuating the thrust reversal means, in particular during takeoff.

To perform this independent actuation, each moving part (sliding cover/nozzle) can be equipped with its own actuator (two single-rod actuators or a double-rod cylinder, for example) and may be driven independently.

In order to lighten the actuating means, it is possible to use one single-rod actuator, by providing appropriate means for locking/unlocking the adaptive nozzle from the sliding cover.

Such a solution and several implementation principles are presented in document FR 2 902 839, in particular in FIGS. 13 to 15.

SUMMARY

The present disclosure provides another locking/unlocking system that is simple, reliable, compact and passive (i.e., not requiring any outside energy supply) for the nozzle that is adaptive to the sliding cover, particularly suitable in the event shared actuating means are used (generally a single-rod cylinder) for these two parts of the downstream section of the nacelle.

The present disclosure provides a locking/unlocking device for a thrust reverser with a sliding cover and an adaptive nozzle, which in one form comprises:
  a fixed pin secured to the fixed structure of said reverser,
  a first sleeve secured to said sliding cover and able to accommodate said pin,
  a second sleeve slidably mounted on said first sleeve;
  a third sleeve secured to said adaptive nozzle and slidably mounted on said second sleeve, first locking means able to lock said first sleeve with respect to said pin, second locking means able to lock said second sleeve with respect to said first sleeve, third locking means able to lock said third sleeve with respect to said second sleeve, the assembly of said locking means being arranged such that said device can in particular assume one of the following configurations:

configuration 1, wherein said sliding cover is locked to said fixed structure and said adaptive nozzle is adjustable: locking of said first sleeve on said pin, locking of said second sleeve on said first sleeve, and sliding freedom of said third sleeve relative to said second sleeve;

configuration 2, wherein said sliding cover is open and secured to said adaptive nozzle, and adjustable in concert with said nozzle: unlocking of said first sleeve relative to said pin, locking of said second sleeve relative to said first sleeve, and locking of said third sleeve relative to said second sleeve.

This system of sliding sleeves and locking keys is a particularly simple design, such that it is inexpensive to produce and maintain, and very reliable.

Furthermore, the concentric arrangement of the various sleeves gives the assembly a very small bulk.

Other features and advantages of the device according to the present disclosure:

said first locking means comprise an area of smaller diameter formed in said pin, first keys passing through said first sleeve, a first profile formed in the second sleeve and capable of pushing said first keys to the bottom of said area when said second sleeve moves in the upstream direction of said first sleeve, and a first spring returning said second sleeve toward its upstream position;

said second locking means comprise cavities formed in said second sleeve, second keys passing through said first sleeve, a slider slidably mounted inside said first sleeve and including a second profile capable of pushing said second keys to the bottom of said cavities when said slider moves in the upstream direction of said second sleeve, and a second spring returning said slider toward its upstream position, in contact with said pin;

said third locking means comprise a shoulder formed downstream from said second sleeve, third keys passing through said second sleeve, and a third profile formed in said first sleeve and capable of pushing said third keys to abut against the upstream edge of said third sleeve when said second sleeve moves downstream of said first sleeve, so as to lock the third sleeve between said third keys and said shoulder;

said device comprises means for damping the downstream abutment of said second sleeve on said first sleeve.

The present disclosure also relates to a thrust reverser with a sliding cover and an adaptive nozzle, remarkable in that it comprises at least one device according to the above.

The present disclosure also relates to an aircraft engine nacelle, remarkable in that it comprises a thrust reverser according to the above.

Further areas of applicability will become apparent from the description provided herein. It should be understood that the description and specific examples are intended for purposes of illustration only and are not intended to limit the scope of the present disclosure.

DRAWINGS

Figure 2:
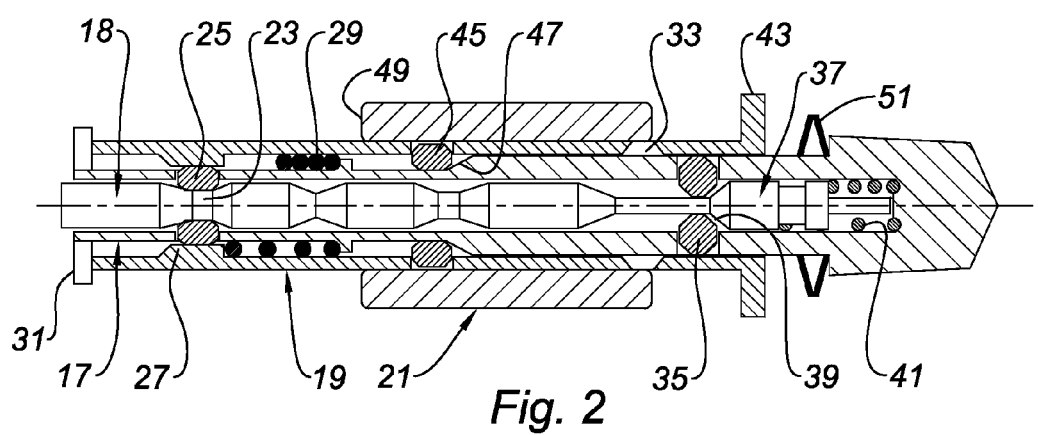
Figure 3:
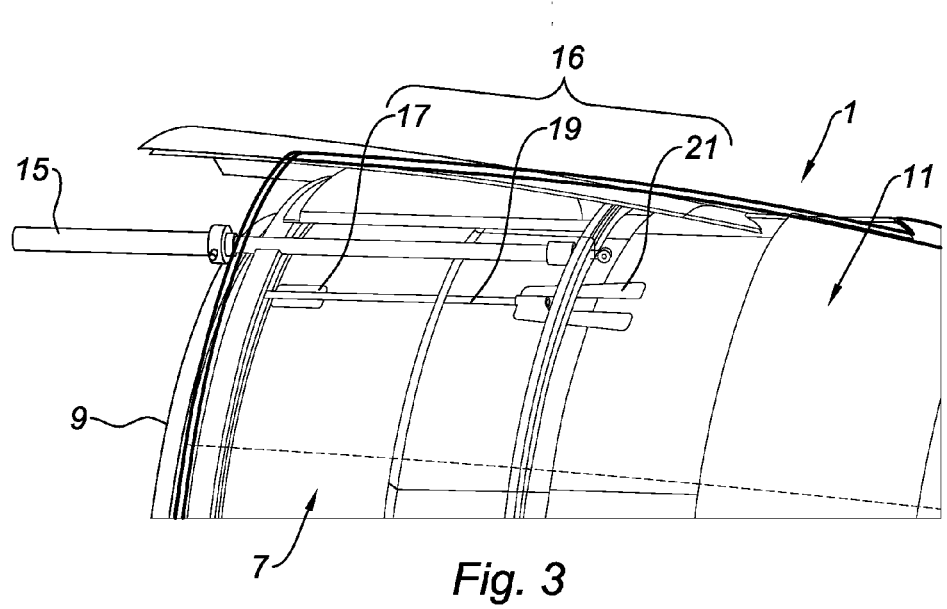
Figure 4:
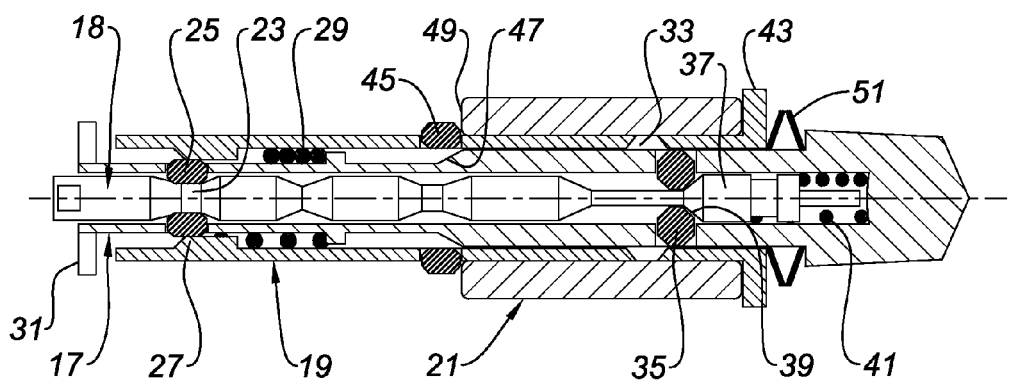
Figure 5:
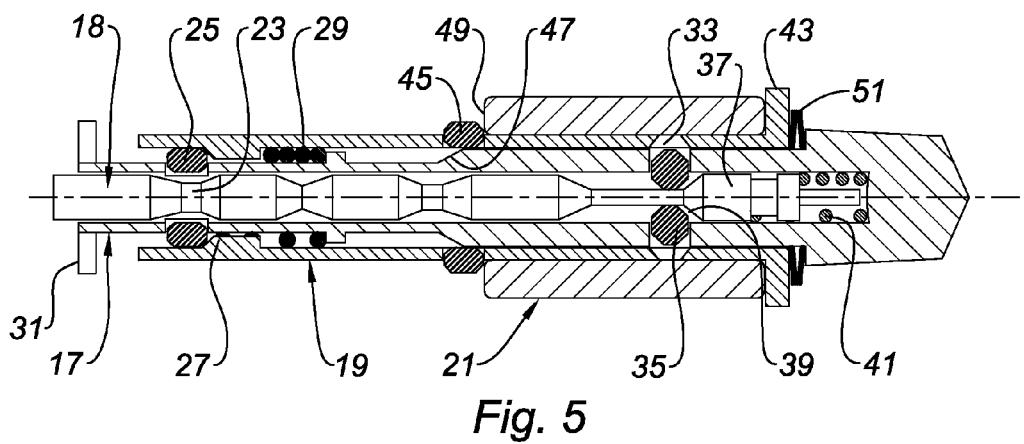
Figure 6:
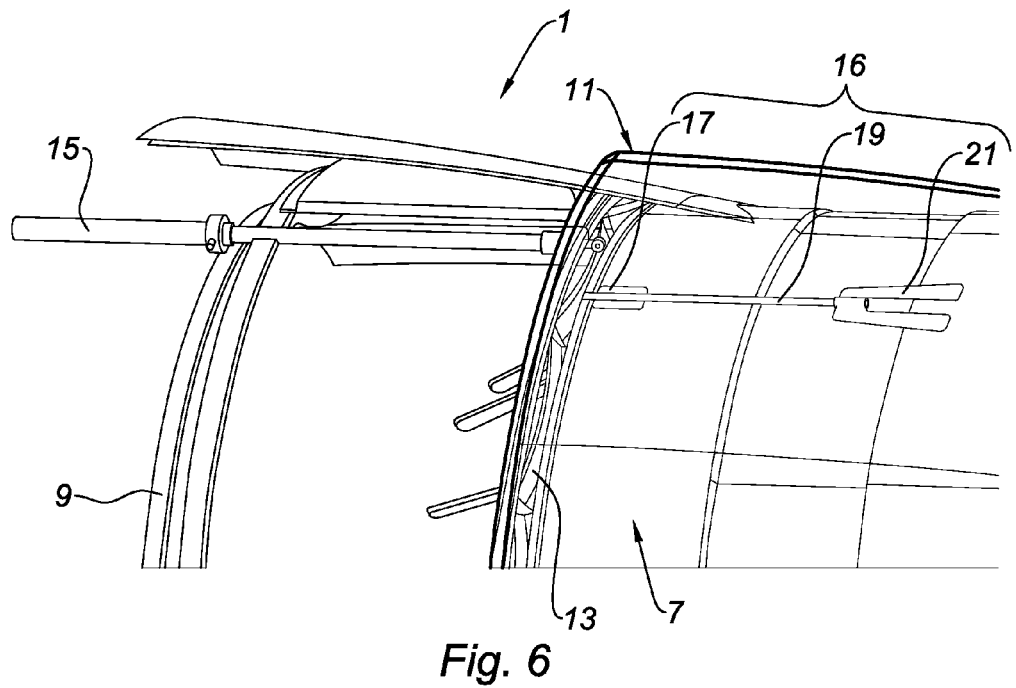
Figure 7:
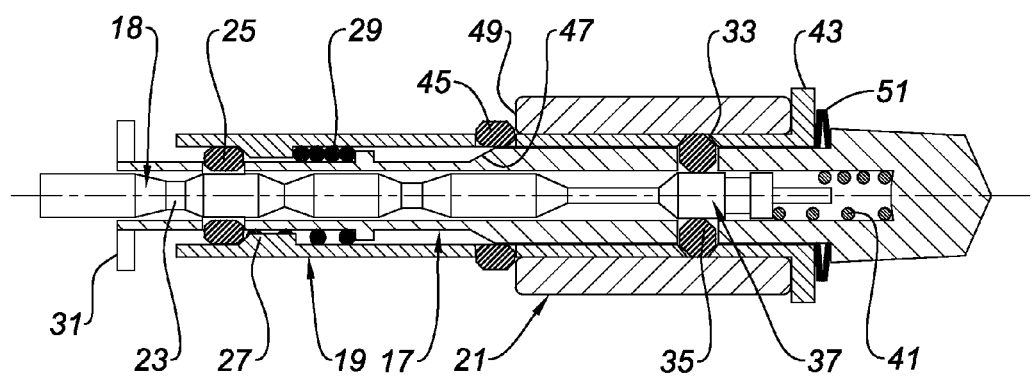

In order that the disclosure may be well understood, there will now be described various forms thereof, given by way of example, reference being made to the accompanying drawings, in which;

FIG. 1 shows a partial perspective view of a cascade thrust reverser including a sliding cover and an adaptive nozzle, incorporating a locking/unlocking device according to the disclosure, said reverser being shown with the thrust reverser cover in the closed or "direct jet" position and the adaptive nozzle being shown in position (smallest section);

FIG. 2 diagrammatically shows the locking/unlocking device in the configuration corresponding to the position of the thrust reverser of FIG. 1;

FIG. 3 is a view similar to FIG. 1, the adaptive nozzle being in the downstream position (large section) and the sliding thrust reversal cover being in the closed position ("direct jet" position);

FIGS. 4 and 5, which are similar to FIG. 2, show the device according to the disclosure in two successive configurations corresponding to the position of the thrust reverser shown in FIG. 3;

FIG. 6, which is similar to FIGS. 1 and 3, shows the thrust reverser with the sliding cover in the open position ("reverse jet" position), and the adaptive nozzle in the same position relative to said sliding cover as in FIG. 3;

FIG. 7 shows the locking/unlocking device according to the disclosure corresponding to the configuration of FIG. 6, and FIGS. 8 to 10 show the different configurations of the locking/unlocking device according to the disclosure corresponding to the return of the thrust reverser from the position shown in FIG. 6 to the position shown in FIG. 3, then lastly, that shown in FIG. 1.

In all of these figures, identical or similar references designate identical or similar members or sets of members.

The drawings described herein are for illustration purposes only and are not intended to limit the scope of the present disclosure in any way.

In all of these figures, identical or similar references designate identical or similar members or sets of members.

DETAILED DESCRIPTION

The following description is merely exemplary in nature and is not intended to limit the present disclosure, application, or uses. It should be understood that throughout the drawings, corresponding reference numerals indicate like or corresponding parts and features.

We will use the terms "upstream" and "downstream" below: these terms must be understood relative to the direction of circulation of the air inside the thrust reverser, i.e., in this case from left to right in all of the illustrated figures.

Reference will now be made to FIG. 1, where one can see a cascade thrust reverser 1 forming the downstream portion of an aircraft turbojet engine nacelle.

This thrust reverser comprises a cover 7, slidably mounted relative to a fixed front frame 9, between a closed (direct jet) position, shown in FIG. 1, and an open (reverse jet) position, shown in FIG. 6.

In the closed position shown in FIG. 1, the sliding cover 7 covers thrust reversal cascade vanes (not shown), such that the secondary flow of air exits downstream of the nozzle 11.

In the open (reverse jet) position, the cover 7 covers the thrust reversal cascade vanes, which allows thrust reversal flaps 13, shown in FIG. 6, to deflect the air circulating in the cold flow tunnel of the thrust reverser toward the outside of the nacelle, and thus to perform the thrust reversal function.

The adaptive nozzle 11, situated downstream of the sliding cover 7, is in turn adapted to slide relative to said cover between an upstream position, shown in FIG. 1, and a downstream position, shown in FIGS. 3 and 6.

The actuation of the sliding cover 7 on the one hand and the adaptive nozzle 11 on the other hand is done using single-rod cylinders 15 distributed on the periphery of the thrust reverser, and acting only on the adaptive nozzle 11, owing to locking/unlocking means 16 that will be described below in more detail.

It should be noted that these locking/unlocking means can be distributed at the periphery of the thrust reverser, in the same way as the actuating cylinders 15.

In reference to FIG. 2, one can see that the locking/unlocking device according to the disclosure comprises a first sleeve 17, secured to the inner portion 5 of the sliding cover 7, a second sleeve 19 slidably mounted on the first sleeve 17, and a third sleeve 21 secured to the adaptive nozzle 11, slidably mounted on the second sleeve 19.

This device also comprises a fixed pin 18 secured to the front frame 9.

This device comprises first locking means made up of an area of smaller diameter 23 of the pin 18, first keys 25 passing through the first sleeve 17, a first profile 27 formed in the second sleeve 17 and capable of pushing the first keys 25 to the bottom of the area 23 when the second sleeve 17 moves in the upstream direction (i.e., to the left in the figure) of the first sleeve 17, and a first spring 29 returning the second sleeve 19 toward its upstream position, abutting against a rib 31 formed in the first sleeve 17.

The device according to the disclosure also comprises second locking means made up of cavities 33 formed in the second sleeve 19, second keys 35 passing through the first sleeve 17, a slider 37 slidably mounted inside the first sleeve 17 and including a second profile 39 able to push the second keys 35 to the bottom of the cavities 33 when the slider 37 moves toward the upstream direction of the second sleeve 17, and a second spring 41 returning the slider 37 to its upstream position, in contact with the pin 18.

The device according to the disclosure also comprises third locking means formed by a shoulder 43 formed downstream of the second sleeve 19, third keys 45 passing through the second sleeve 19, and a third profile 47 able to push the third keys 45 to abut against the upstream edge 49 of the third sleeve 21, when the second sleeve 19 moves in the downstream direction of the first sleeve 17, so as to lock the third sleeve 21 between the third keys 45 and the shoulder 43.

The structure of the locking/unlocking device having been described, we will now analyze the operation thereof.

In the position shown in FIG. 2, the second sleeve 19 is returned to its upstream position abutting against the edge 31 of the first sleeve 17, under the action of the first spring 29, which results in keeping the first keys 25 inside the area of smaller diameter 23 of the pin 18, through the action of the first profile 27 of the second sleeve 19.

This results in locking the first sleeve 17 on the pin 18, and therefore preventing the sliding cover 7 from opening.

It should be noted that the sliding of the second sleeve 19 relative to the first sleeve 17 is in turn locked by the third keys 45, which abut against the third profile 47 of the first sleeve 17.

In this configuration, the third sleeve 21 is on the other hand free to slide relative to the second sleeve 19, under the action of the cylinder 15: in this way, it is possible to regulate the position of the adaptive nozzle 11, so as to obtain the desired section for the discharge of the cold air flow downstream of the nacelle.

It is in particular possible to bring the adaptive nozzle 11 into the maximum downstream position of FIG. 3, making it possible to obtain the maximum cold air outlet section, in particular corresponding to the landing phases.

During this maximum travel of the adaptive nozzle 11, the locking/unlocking device according to the disclosure successively assumes the configurations of FIGS. 4 and 5.

In FIG. 4, one can see that the third sleeve 21 abuts against the shoulder 43 of the second sleeve 19, which results in releasing the third keys 45 toward the outside of the second sleeve 19, and thereby allows said second sleeve 19 to slide in the downstream direction of the first sleeve 17.

This first results in releasing the first keys 25 toward the outside of the first sleeve 17, as shown in FIG. 5: in this way, the first sleeve 17 is unlocked relative to the pin 18.

This secondly results in placing the cavities 33 of the second sleeve 19 across from the second keys 35, as shown in FIG. 5.

Once the configuration of FIG. 5 is reached, it is understood that the second sleeve 21 is locked on the one hand by the shoulder 43 of the second sleeve 19, and on the other hand by the third keys 45, such that the second sleeve 19 and the third sleeve 21 move in concert under the action of the cylinder 15.

In particular, when, from the configuration of FIG. 5, one wishes to proceed with a thrust reversal, i.e., when one wishes to slide the cover 7 toward its downstream position, one continues to extend the length of the cylinder 15 until the second spring 41 pushes the slider 37 toward its position shown in FIG. 7, in which the second profile 39 of said slider tends to separate the second keys 35 toward the inside of the cavities 33 of the second sleeve 19, thereby securing the second sleeve 19 with the first sleeve 17.

It will be understood that at this stage, the third sleeves 17, 19 and 21 form a single block, which can be actuated in concert with the cylinder 15: in this way, one acts on the sliding cover 7 by means of the adaptive nozzle 11, these two elements moving in a single block under the action of the cylinder 15.

Figure 8:
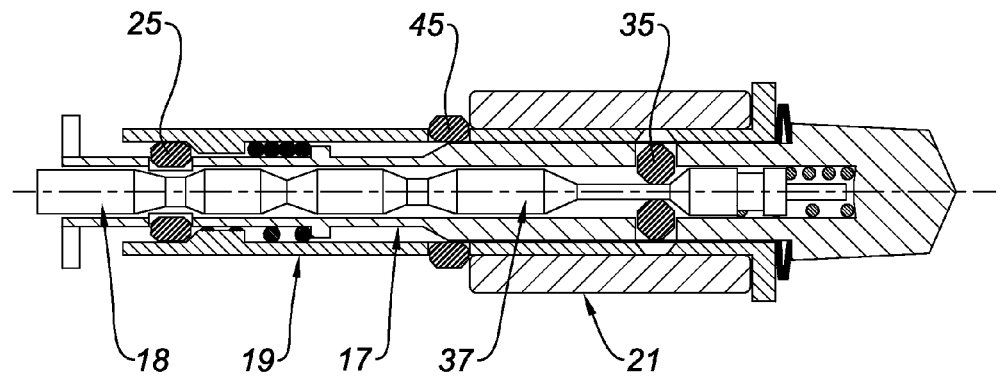
Figure 9:
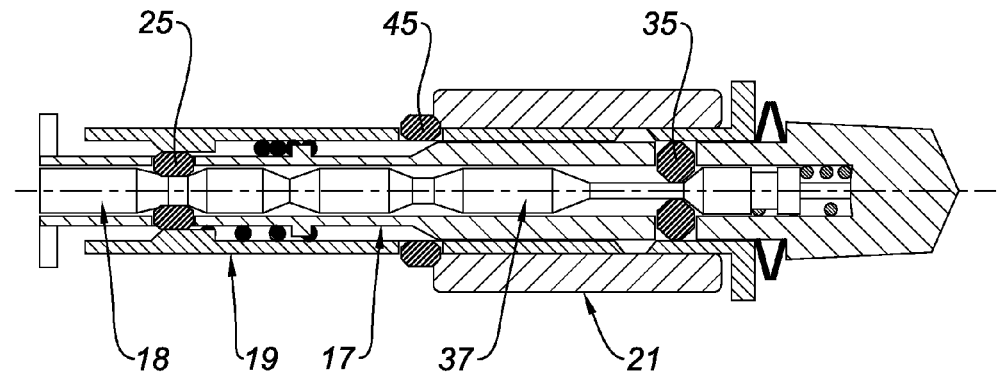
Figure 10:
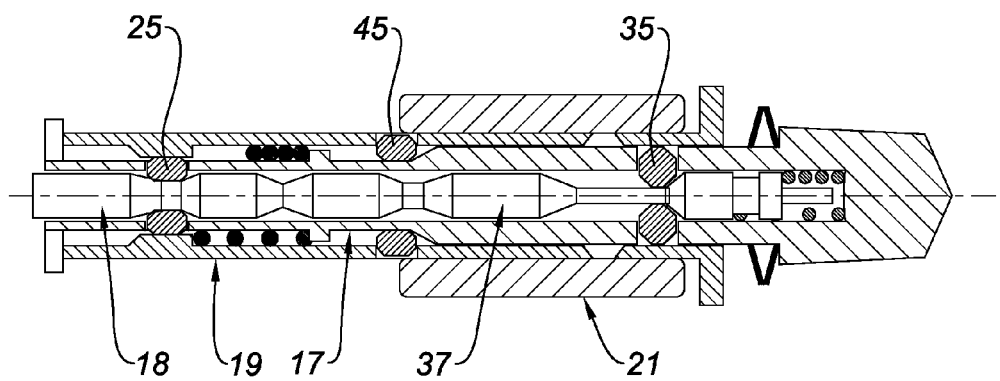

Starting from this configuration, which corresponds to a landing situation of the aircraft, when one wishes to return toward the initial position (sliding cover 7 closed and nozzle 11 re-situated in its upstream position), the length of the cylinder 15 is retracted, which results in placing the locking/unlocking device according to the disclosure in the successive positions shown in FIGS. 8 to 10.

In FIG. 10, one can see that the return of the assembly formed by the three sleeves under the action of the cylinder 15 results in pressing the end of the pin 18 against the slider 37, and thereby pushing the latter back toward the bottom of the first sleeve 17, against the force exerted by the second spring 41.

In so doing, the second particular profile 39 of the slider 37 results in allowing the second keys 35 to return toward the inside of the first sleeve 17, and thereby unlocking the second sleeve 19 relative to the first sleeve 17.

This makes it possible, once the sliding cover 7 has returned to its closed position, in which it is edge-to-edge with the front frame 19 to which the pin 18 is fixed, to return the adaptive nozzle 11 toward its upstream position, by continuing to retract the length of the cylinder 15.

In so doing, one first arrives at the position of FIG. 9, in which the first profile of the second sleeve 19 returns the first keys 25 to the bottom of the area of smaller diameter 23 of the pin 18, thereby locking the first sleeve 17, i.e., the sliding cover 7, on the pin 18.

One lastly arrives at the position of FIG. 10, in which the third keys 45 return to the inside of the second sleeve 19, owing to the particular shape of the third profile 47 of the first sleeve 17, thereby allowing the third sleeve 21 to return upstream, i.e., allowing the adaptive nozzle 11 to return toward its position of minimum section.

It should be noted that damping means 51 are present arranged between the shoulder 43 of the second sleeve 19 and the first sleeve 17, so as to absorb the abutment shock of said second sleeve 19 against said first sleeve 17, in particular in the steps shown in FIG. 5.

As one will have understood in light of the preceding, the locking/unlocking device according to the disclosure has a simple mechanical design, which makes it inexpensive to produce and maintain.

Furthermore, due to the concentric arrangement of the three sleeves 17, 19, 21, this locking/unlocking device is not very bulky, which is very advantageous in the environment of a nacelle, where many other members must be arranged.

Of course, the present disclosure is in no way limited to the embodiments described and shown, which have been provided solely as examples.

What is claimed is:

1. A locking/unlocking device for a thrust reverser with a sliding cover and an adaptive nozzle, comprising:
    a fixed pin secured to a fixed structure of said thrust reverser,
    a first sleeve secured to said sliding cover and able to accommodate said pin,
    a second sleeve slidably mounted on said first sleeve,
    a third sleeve secured to said adaptive nozzle and slidably mounted on said second sleeve,
    first locking means able to lock said first sleeve with respect to said pin,
    second locking means able to lock said second sleeve with respect to said first sleeve,
    third locking means able to lock said third sleeve with respect to said second sleeve, an assembly of said locking means being arranged such that said device assumes one of the following configurations:
    configuration 1, wherein said sliding cover is locked to said fixed structure and said adaptive nozzle is adjustable: locking of said first sleeve on said pin, locking of said second sleeve on said first sleeve, and sliding freedom of said third sleeve relative to said second sleeve;
    configuration 2, wherein said sliding cover is open and secured to said adaptive nozzle, and adjustable in concert with said adaptive nozzle: unlocking of said first sleeve relative to said pin, locking of said second sleeve relative to said first sleeve, and locking of said third sleeve relative to said second sleeve.

2. The device according to claim 1, wherein said first locking means comprise an area of smaller diameter formed in said pin, first keys passing through said first sleeve, a first profile formed in the second sleeve and capable of pushing said first keys to a bottom of said area when said second sleeve moves in an upstream direction of said first sleeve, and a first spring returning said second sleeve toward an upstream position thereof.

3. The device according to claim 1, wherein said second locking means comprise cavities formed in said second sleeve, second keys passing through said first sleeve, a slider slidably mounted inside said first sleeve and including a second profile capable of pushing said second keys to the bottom of said cavities when said slider moves in an upstream direction of said second sleeve, and a second spring returning said slider toward an upstream position thereof, in contact with said pin.

4. The device according to claim 1, wherein said third locking means comprise a shoulder formed downstream from said second sleeve, third keys passing through said second sleeve, and a third profile formed in said first sleeve and capable of pushing said third keys to abut against an upstream edge of said third sleeve when said second sleeve moves downstream of said first sleeve, so as to lock the third sleeve between said third keys and said shoulder.

5. The device according to claim 1, further comprising means for damping a downstream abutment of said second sleeve on said first sleeve.

6. A thrust reverser with a sliding cover and an adaptive nozzle, wherein the thrust reverser further comprises at least one device according to claim 1.

7. An aircraft engine nacelle, wherein the aircraft engine nacelle further comprises a thrust reverser according to claim 6.

* * * * *